May 28, 1968  S. G. CHRISTIAN ET AL  3,384,958
METHOD OF BRAZING
Filed June 30, 1965
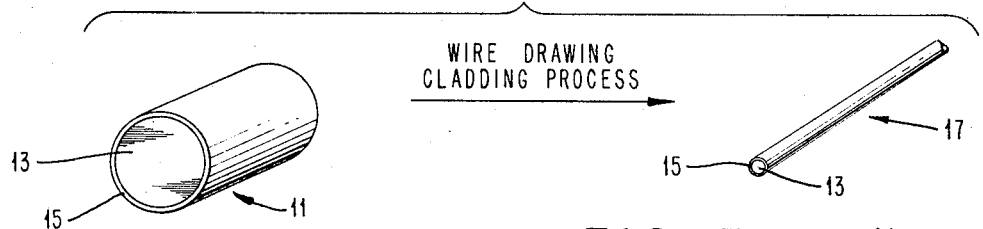
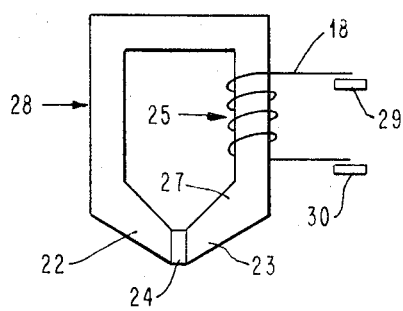
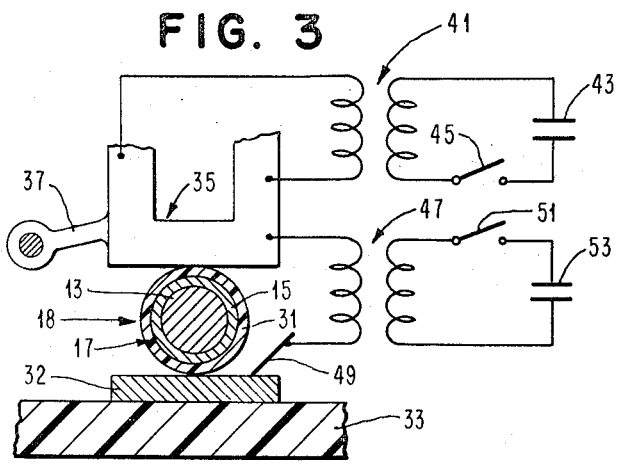
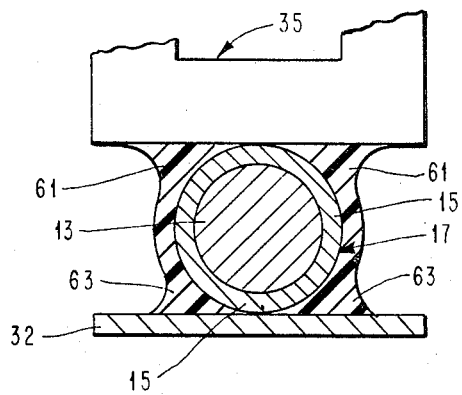
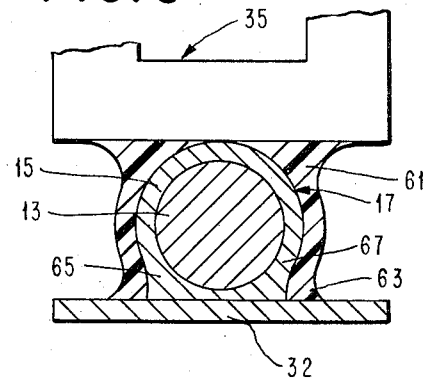
INVENTORS
STANLEY G. CHRISTIAN
EDWARD G. REINITZ
ADOLPH W. RZANT
BY *Robert W. Ely*
ATTORNEY United States Patent Office 3,384,958
Patented May 28, 1968

3,384,958
METHOD OF BRAZING
Stanley G. Christian, Poughkeepsie, Edward G. Reinitz, Fishkill, and Adolph W. Rzant, Poughkeepsie, N.Y., assignors to International Business Machines Corporation, Armonk, N.Y., a corporation of New York
Filed June 30, 1965, Ser. No. 468,272
8 Claims. (Cl. 29—628)

ABSTRACT OF THE DISCLOSURE

A small wire having a particular brazing material clad thereto consisting of 82.5% copper, 15% silver and 2.5% phosphorus by weight, is used to provide a bond between the braze clad wire and another electrical component.

---

This invention relates to the bonding of metal to metal and more particularly concerns the use of a brazing alloy to join two members, such as a wire to a terminal to give an electrical connection.

An object of the present invention is the provision of a method of brazing with a braze-clad wire wherein a bond which has proper mechanical and electrical properties is formed between the wire and another electrical element.

A further object is to provide a method of bonding with such a clad wire of small size and proportions so that very thin members can be joined to the small wire.

An additional object is the provision of a method of bonding a clad wire to a terminal wherein the effective heat is briefly applied locally so that the contact portion of the clad melts to form a bond with the terminal.

Another object of the present invention is to provide a small copper wire which is so clad with a brazing alloy that the wire can be brazed to another member at a relatively low temperature and with self-fluxing capability.

The above objects are realized in a preferred embodiment of the invention by providing a small wire having a particular cladding of braze material and by a method of bonding which provides localized heating. It was discovered that a brazing material having particular composition could be clad on a core by wire drawing technique without encountering brittleness. The composition by weight is 82.5% copper, 15% silver and 2.5% phosphorus. The total clad thickness is 1 to 10% of the wire diameter. In making an electric connection with this wire, the wire is positioned on a terminal and an electrode having heat sink capability is placed on the wire so that a tangential part of the clad contacts the terminal. A brief pulse of current is passed through the wire to the terminal. Localized heating at the contact location results and gives a fillet bond and electrical connection. Adverse effects to thin terminals and the mounting boards are avoided. Small size wires are especially adapted to be connected by this method. When the clad wire is insulated, the brazing step will follow the step of melting the insulation.

A complete understanding of the invention, along with the advantages and features thereof, will be apparent from the following description and the accompanying drawings in which:

FIG. 1 is a schematic representation and shows how a composite cylinder is drawn into a small composite wire, FIG. 2 is a schematic view in which an elongated clad wire forms a coil for a magnetic head and shows the two ends of the coil positioned for bonding to terminals, FIG. 3 is a schematic view of a set-up for bonding the insulated clad wire to a conductor on plastic board and shows an electrical circuit for producing two pulses of current, FIG. 4 is a partially cross-sectional view of the brazing electrode, the wire and the terminal and shows the insulation displaced at top and bottom, and FIG. 5 is a view of the FIG. 4 elements after the metallic bonding at the bottom of the wire has occurred.

In FIG. 1, the method of making a small diameter, clad wire is suggested by showing at the left a relatively large cylindrical block or billet 11 which is comprised of a cylindrical copper core 13 and an outer annulus 15 of metallic brazing material. As indicated by the relative dimensions of the block 11, the diametrical total dimension of relatively large annulus 15 constitutes 10% of the diameter of the block, 5% at each side. As suggested by the legend, the block 11 is subjected to a conventional wire drawing process which greatly reduces the dimensions to give an elongated, small, clad wire 17. The proportions between the clad and core remain the same in wire 17 at the right of FIG. 1. The diameter of a typical wire made by this process is 0.0031 inch. The practical range of diameters for such clad wire is 0.0001 to 0.0250 inch. It is to be appreciated that the composition of the brazing material, since comprised of copper, silver and phosphorus, must be suitable for the fine wire drawing (not too brittle due to phosphorus), must be self-fluxing (basically due to phosphorus), must be easily melted, and yet must result in a highly satisfactory braze or bond for an electrical connection. It was discovered that these considerations were satisfied when the clad composition was, by weight, copper (82.5%), silver (15%), and phosphorus (2.5%). The core 13 prefereably is copper of high purity for high thermal and electrical conductivity. It is apparent that the clad must be continuous and not of such character to break away during fine wire handling or brazing. The cladding of a brazing material has a total diametrical range of 1 to 10% of the clad wire diameter. In other words, the core diameter constitutes 99 to 90% of the diameter of the clad wire. A 3% proportion is preferred and is equivalent to stating that the core diameter constitutes 97% of the clad wire diameter. In the interest of clarity, the dimension of the cladding 15 on wire 17 is enlarged on the drawing, especially in FIGS. 3–5.

In FIG. 2, one application of the wire with a suitable insulation having a melting point below 800° F., such as polyurethane or polyvinylchloride, is shown schematically to suggest a recording head having two poles 22 and 23 separated by a non-magnetic gap spacer 24. The insulated wire 18 forms a coil 25 around the right upright section 27 of the generally-inverted-U-shaped body 28. The two ends of the coil 25 are positioned above two terminals 29 and 30 so that they can be resistance-brazed to the terminals which can be the printed circuit type, as will be described. It is to be noted that the wire is an elongated active part of an electrical device, having ends which are bondable, without external braze material, to terminals 29 and 30. The terminals can be formed from inexpensive, commercial, electrically-conductive metals, such as copper, brass, brass alloys, iron, iron alloys, and nickel. The melting point of the terminal metal significantly exceeds that of the braze material (1300° F.), for example, copper melts at 1981° F. Other applications of such a clad copper wire include use of the wire as the coil of relays, as the wires associated with annular ferrite cores in computer memories and interconnections theren as single or multiple strands, as electric motor windings, and as appliance cords which can be directly connected to the heating element where temperatures approach 1000° F. In certain applications, the wire core 13 can be made from the above-mentioned terminal metals. It is to be noted that in some applications, the wire 17 does not require insulation and permits printed circuit conductor line repair and interconnecting of edge electrical terminals of multilevel modules to vertical clad wires, for example.

Referring to FIG. 3, it can be seen that the clad wire 17 has an insulation coating 31 which can be polyurethane or some similar low melting point dielectric plastic and thus provides the insulated wire, above mentioned. The metallic terminal 32 is thin copper foil or plate mounted on a plastic base 33, such as epoxy resin with glass fibers, polytetrafluorethylene or polyethylene terephthalate, which would be distorted by extended high temperature heating. The brief heat input for brazing used herein also does not adversely affect adhesives used in bonding foil to such a substrate or base. The preferred copper wire core 13 and its braze cladding 15 are encased by insulation 31 with its bottom part contacting the terminal 32 and its top part contacting the U-shaped electrode 35. Electrode 35 is mounted by means of a pivot arm 37 so that it is urged downwardly slightly by its own weight or other means (not shown). A transformer 41 is connected to electrode 35 and is also connected to a condenser 43 through switch 45. Another transformer 47 is connected to electrode 35 and to a schematically-shown finger or electrode 49 which contacts terminal 32. Transformer 47 is also connected through switch 51 to condenser 53. This brazing apparatus is essentially as shown and claimed in U.S. patent application S.N. 324,698, filed Nov. 19, 1963, now U.S. Patent No. 3,263,059 by A. W. Rzant and assigned to the assignee of this application. It is to be understood that suitable means (not shown) are provided for recharging the condensers and the alternating current means could be substituted for the D.C. sources for brief current pulses.

In FIG. 4, the electrode 35 has been heated to melt and displace top and bottom parts of the insulation into top fillets 61 and bottom fillets 63. The thickness of the element 32 is reduced from the thickness of the FIG. 3 terminal in order to point up the fact that the described small wires have particular utility with plated and etched copper elements having a thickness in the range of 0.0001 to 0.0025 inch.

In FIG. 5, the electrode 35 has moved farther downwardly since current has passed from electrode 35 through wire 17 and to terminal 32 to give partial melting of the clad 15. The bottom of the cladding is partially melted by the current to form braze fillets 65 and 67.

In operation, the insulated, clad wire 18 is positioned on the thin terminal 32 with electrode 35 urging the wire down or against the terminal and the finger 49 (shown schematically) is placed in contact with the terminal 32, normally fore or back of the electrode. Switch 45 is closed to discharge the condenser 43 through transformer 41 to provide a heating crcuit through electrode 35. The top part of insulation 31 is melted and the downwardly-urged electrode 35 contacts and briefly heats the cladding 15 and core 13 so that the bottom part of the insulation is melted and the bottom cladding 15 contacts terminal 32 with insulation fillets 61 and 63 being formed. When the arrangement is such that the cladding contacts the electrode and the terminal, brazing circuit switch 51 is closed and a brief pulse of current passes from electrode 35 through wire 17 to terminal 32. The localized application of this current melts the lower part of the annulus or cladding 15 to provide a bond between the wire and the terminal with braze fillets 65 and 67 being encased by the insulation fillet portions. The cladding is not melted during the brief, low temperature insulation melting phase because of the higher melting point of the cladding and the brief time (1–3 milliseconds). The top part of the cladding is not melted during the brief brazing phase because the mass of the electrode gives it a heat sink effect and is such as to give the proper heat balance or heat dissipation at this location in conjunction with the relatively brief period of time for the brazing phase.

It is to be understood that wire 17 would not be insulated in some instances. The operation then would be arranging the clad wire 17, electrode 35 and terminal 32 as shown in FIG. 4 with exclusion of the insulation 31. Switch 51 for the brazing circuit would then be closed to pass current from electrode 35 through the wire to finger electrode 49 and the brief application of heat would melt the bottom part of the brazing material 15 which, upon solidification, would give the bond with fillets 65 and 67 as shown in FIG. 5. It is to be understood that the brief duration of current pulse and the amperage are selected to melt partially the contact part of the cladding for the FIG. 5 result. The material of the base (FIG. 3) and adhesive which mounts the copper foil terminal are not adversely affected by the brief current pulses which are used for these applications.

Removal of insulation material from the molybdenum electrode 35 (when raised above its work position) is done by closing switch 45 to discharge condenser 43 through the electrode so that the electrode is heated above its oxidation point with subsequent sublimation of the oxide with the adhered insulation. Without insulation, copper or other high electrically conductive material can be used for the electrode.

In reconnecting broken "printed circuit" lines having a thickness of 0.0014 inch, a clad copper wire having a diameter of 0.010 inch was bonded using 90 amperes for 0.001 second and using 80 amperes for 0.003 second. In the same application, a clad copper wire having a diameter of 0.0031 was bonded using 60 amperes for 5 milliseconds. In all bonding of the type herein described, the duration of the brief current pulse is appreciably less than one second. This short pulse heating has eliminated brittle intermetallics. It is apparent that energy amplitude and duration are predetermined so that the cladding is melted to product a fillet bond. In some instances, larger fillets than illustrated may be desired, even to the extent that the wire core contacts the terminal surface, by applying a slightly larger predetermined pulse. It is to be noted that there is slight contact at the tangential point so that a localized high current density results, giving briefly a relatively high temperature for the cladding which has a melting point of 1300° F.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The method of metallic bonding to provide an electrical connection comprised of:

providing a member formed of a metal commonly used for electrical purposes, providing through wire drawing techniques a small composite wire having a core and an annular coating of braze material, said core being formed of a metal commonly used for electrical purposes, said braze material being composed by weight of 82.5% copper, 15% silver, and 2.5% phosphorus, arranging said wire so that a small part of said braze coating is in contact with said metallic member, and applying briefly heat to the small part of said braze coating in contact with said metallic member so that the heated braze material at least partially melts and wets said metallic member and so that upon solidification the braze material bonds the wire to the member.

2. The method according to claim 1 and being further characterized by:

said step of applying heat being accomplished by placing an electrode in contact with the part of said braze coating opposite the part of the coating in contact with the member and passing an electrical current from the electrode through the wire to said member.

3. The method of forming an electrical connection comprised of:

providing an electrical terminal having a range of thickness from 0.001 to 0.0025 inch, providing a composite wire having a diameter of 0.0001 to 0.025 inch and composed of a copper core and a cladding formed by wire drawing with the core diameter being 90 to 99% of the wire diameter, said cladding having a composition by weight of 82.5% copper, 15% silver and 2.5% phosphorus, positioning said wire on said terminal so that the cladding is in contact with said terminal, placing an electrode on the cladding of said wire opposite said terminal, and passing briefly an electric current from said electrode through said wire to said terminal so that cladding adjacent said terminal melts whereby upon solidification the melted brazing material bonds the wire to the terminal to provide an electrical connection.

4. The method according to claim 3 and being further characterized by:

encasing said composite wire with a plastic insulation prior to said step of positioning, and passing a heating current through said electrode and urging it downwardly to melt and displace the top and bottom insulation so that said steps of positioning and placing result.

5. The method of metallic bonding for small wires comprised of:

providing a metallic member to be connected to a wire, providing through wire drawing techniques a composite wire having a core and a thin coating of braze material, said braze coating having a composition by weight of 82.5% copper, 15% silver and 2.5% phosphorus, said wire having a diameter of less than 0.025 of an inch, arranging said wire so that a small bottom part of said braze coating is in contact with said metallic member, applying briefly heat to the small part of said braze coating in contact with said metallic member so that the heated braze material melts and wets said metallic member whereby upon solidification the braze material bonds the wire to the member, and said step of applying heat being accomplished by placing an electrode in contact with the top part of said braze coating and passing an electrical current from the electrode through the wire to said member.

6. A process of brazing wherein external braze material is not required and an electrical circuit provides the heat, comprised of:

providing through wire drawing techniques an elongated, electrically-active wire having a coating of braze material covered by plastic insulation, said braze coating having a composition by weight of 82.5% copper, 15% silver and 2.5% phosphorus, providing a metallic electrically-conductive terminal, positioning an end of said wire on said terminal, lowering an electrode which is urged downwardly into contact with said wire, passing a first current through said electrode to melt the insulation so that there is electrode to wire contact and wire to terminal contact, and passing briefly a second current through said electrode, said wire and said terminal so that the braze material on said wire adjacent said terminal is melted and so that said wire and terminal are bonded together by said melted braze material when solidified.

7. The method of making an electrical connection comprising:

providing a first metallic member of a material having good electrical conductivity and selected from the group consisting of copper, brass, brass alloys, iron, iron alloys and nickel, providing through wire drawing techniques a second metallic member having a copper core part and a cladding on and encasing the core part, said cladding being composed by weight of 82.5% copper, 15% silver and 2.5% phosphorus, placing said members in contact for a small dimension to provide a bonding contact location, applying heat briefly so that said cladding melts only at said contact location and wets the adjacent surface of said second member, and maintaining said members so that said melted cladding solidifies to form fillet bonds providing an electrical and mechanical connection.

8. The method of making an electrical connection comprising:

providing a metallic terminal of a material having good electrical conductivity, providing a small composite wire core part and a cladding on and encasing the core part formed by wire drawing techniques, said cladding being composed by weight of 82.5% copper, 15% silver and 2.5% phosphorus, placing said terminal and wire in contact for a small dimension to provide a bonding contact location, applying heat briefly so that said cladding melts only at said contact location and wets the adjacent surface of said terminal, maintaining said terminal and wire so that said melted cladding solidifies to form fillet bonds providing electrical and mechanical connection, said wire having a core which has a diametrical dimension which is less than 90% of the diameter of said wire, and said terminal having a thickness of less than 0.0025 of an inch and being attached to a base which is made of a relatively low temperature melting plastic material.

References Cited

UNITED STATES PATENTS

| | | | |
|---|---|---|---|
| 3,025,596 | 3/1962 | Ward | 29—474.4 X |
| 3,032,870 | 5/1962 | Rohrberg | 29—501 X |
| 3,097,965 | 7/1963 | Wilkins | 29—502 X |
| 3,101,531 | 8/1963 | Roseberry | 29—474.4 |
| 3,167,857 | 2/1965 | Saito | 29—492 X |
| 3,263,059 | 7/1966 | Rzant | 219—91 |
| 3,264,524 | 8/1966 | Dahlgren | 29—504 X |

JOHN F. CAMPBELL, *Primary Examiner.*

R. F. DROPKIN, *Assistant Examiner.*